(12) United States Patent
Fisher et al.

(10) Patent No.: US 11,383,224 B2
(45) Date of Patent: Jul. 12, 2022

(54) CERIA-CONTAINING MIXED OXIDES FOR OXYGEN STORAGE

(71) Applicant: JOHNSON MATTHEY PUBLIC LIMITED COMPANY, London (GB)

(72) Inventors: Janet Fisher, Reading (GB); Amy Kolpin, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 45 days.

(21) Appl. No.: 16/837,065

(22) Filed: Apr. 1, 2020

(65) Prior Publication Data
US 2020/0316565 A1 Oct. 8, 2020

(30) Foreign Application Priority Data
Apr. 3, 2019 (GB) .................................. 1904694

(51) Int. Cl.
| | | |
|---|---|---|
| *B01J 21/06* | (2006.01) | |
| *B01J 23/00* | (2006.01) | |
| *B01J 23/10* | (2006.01) | |
| *B01J 35/10* | (2006.01) | |
| *F01N 3/08* | (2006.01) | |
| *F01N 3/10* | (2006.01) | |

(52) U.S. Cl.
CPC ............. *B01J 23/10* (2013.01); *B01J 23/002* (2013.01); *B01J 35/1014* (2013.01); *F01N 3/0814* (2013.01); *F01N 3/0842* (2013.01); *F01N 3/101* (2013.01)

(58) Field of Classification Search
CPC ...... B01J 21/063; B01J 21/066; B01J 23/002; B01J 23/10; B01J 35/1014; F01N 3/0814; F01N 3/0842; F01N 3/101

USPC .................................. 502/302–304, 349–351
See application file for complete search history.

(56) References Cited

U.S. PATENT DOCUMENTS

| | | | |
|---|---|---|---|
| 5,712,218 A * | 1/1998 | Chopin | C01G 25/02 502/304 |
| 6,468,941 B1 | 10/2002 | Bortun et al. | |
| 7,641,875 B1 * | 1/2010 | Golden | C04B 35/486 423/213.5 |
| 7,871,957 B2 | 1/2011 | Willigan et al. | |

(Continued)

FOREIGN PATENT DOCUMENTS

| | | |
|---|---|---|
| CN | 1817447 A | 8/2006 |
| CN | 101219392 A | 7/2008 |
| CN | 101249459 A | 8/2008 |

OTHER PUBLICATIONS

Ge et al., "A Mesoporous Ce0.5Zr0.5O2 Solid Solution Catalyst for CO Hydrogenation to iso-C4 Hydrocarbons," Catal Lett (2008) 126:193-199.

*Primary Examiner* — Cam N. Nguyen

(57) ABSTRACT

The present disclosure is directed to compositions comprising Ce-containing mixed oxides, especially those having a stoichiometry of $Ln_y Ce_x M_w O_z$; where
  $0.15 \leq x \leq 0.5$, $y \leq 0.25$, $w = (1-x-y) \geq 0.5$, and $z = (2x+2w+1.5y)$;
M is Zr, Hf, Ti, Sn or Ge or a combination thereof;
Ln is Y and/or one or more rare earth metals, exclusive of Ce,
and the uses of these compositions. These compositions are characterized by the even distribution of the Ce in the lattice of the mixed oxide.

15 Claims, 4 Drawing Sheets

OSC 1A

OSC 1B (56) References Cited

U.S. PATENT DOCUMENTS

| | | |
|---|---|---|
| 2007/0244002 A1 | 10/2007 | Kozlov et al. |
| 2013/0058861 A1 | 3/2013 | Idem et al. |
| 2015/0111729 A1* | 4/2015 | Princivalle ............. B01J 23/002 502/304 |
| 2018/0250657 A1 | 9/2018 | Morikawa et al. |
| 2019/0039049 A1 | 2/2019 | Itoh et al. |

* cited by examiner

CERIA-CONTAINING MIXED OXIDES FOR OXYGEN STORAGE

FIELD OF THE INVENTION

The invention relates to compositions comprising Ce-containing mixed oxides, especially those having a stoichiometry of $Ln_yCe_xM_wO_z$; where
- $0.15 \leq x \leq 0.5$; $y \leq 0.25$; $w = (1-x-y) \geq 0.5$; and $z = (2x+2w+1.5y)$;
- M is Zr, Hf, Ti, Sn or Ge or a combination thereof;
- Ln is Y and/or one or more rare earth metals, exclusive of Ce;

the use of these crystalline mixed oxides as oxygen storage materials. Preferably, the compositions are characterized by the distribution of the Ce in the lattice of the mixed oxide. These compositions are useful as oxygen storage compositions and in a range of associated catalytic applications.

BACKGROUND

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the Three-Way Catalyst (TWC). TWCs perform three main functions: (1) oxidation of CO; (2) oxidation of unburnt HCs; and (3) reduction of $NO_x$ to $N_2$.

TWCs that usually consist of Platinum Group Metals (PGMs) dispersed over high surface area alumina and ceria-zirconia supports were first introduced in the early 1980s for gasoline engine aftertreatment. With the need to meet increasingly more stringent emission limits, identifying alternative catalyst compositions which have improved catalytic properties for automotive applications is desirable. Thus, there are still needs to improve and synthesize novel TWC compounds with optimized catalytic properties.

SUMMARY OF THE INVENTION

In a first aspect of the invention, there is provided a composition comprising a crystalline mixed oxide having a stoichiometry of $Ln_yCe_xM_wO_z$; where
- $0.15 \leq x \leq 0.5$, $y \leq 0.25$, $w = (1-x-y) \geq 0.5$, and $z = (2x+2w+1.5y)$;
- M is Zr, Hf, Ti, Sn or Ge or a combination thereof;
- Ln is Y and/or one or more rare earth metals, exclusive of Ce; and
- wherein the Ce is evenly distributed through the lattice.

In a second aspect of the invention, there is provided a method of preparing the crystalline mixed oxide as hereinbefore defined, the method comprising:
(a) subjecting oxide precursors of the Ce, the one or more of Zr, Hf, Ti, Sn or Ge and the optional Y and/or one or more other rare earth metals, exclusive of Ce to reduction conditions to form a reduced form of the crystalline mixed oxide; and
(b) oxidizing the reduced form of the crystalline mixed oxide to form the crystalline mixed oxide.

In a third aspect of the invention, there is provided a method of redistributing the Ce atoms within an initial Ce-containing mixed oxide composition to provide a final Ce-containing mixed oxide composition having a Ce—Ce coordination number (CN) that is within 20%, 15%, 10%, 5% or less of the theoretical minimum value for the corresponding composition assuming perfect Ce distribution,
the initial Ce-containing mixed oxide composition having a stoichiometry of $Ln_yCe_xM_wO_z$; where
- $0.15 \leq x \leq 0.5$, $y \leq 0.25$, $w = (1-x-y) \geq 0.5$, and $z = (2x+2w+1.5y)$;
- M is Zr, Hf, Ti, Sn or Ge or a combination thereof;
- Ln is Y and/or one or more rare earth metals, exclusive of Ce;
the method comprising:
(a) subjecting the initial mixed oxide to reducing conditions to form a reduced form of the crystalline mixed oxide; and
(b) oxidizing the reduced form of the crystalline mixed oxide to form the crystalline mixed oxide.

In a fourth aspect of the invention, there is provided the use of any one of the compositions as hereinbefore defined in (a) a gasoline after-treatment system, such as in a TWC or (coated) gasoline or diesel particulate or soot filter; (b) a lean $NO_x$ trap for diesel after-treatment system; (c) a passive $NO_x$ adsorber (PNA); (d) a diesel oxidation catalyst (DOC); (e) a Water-Gas Shift catalyst; (f) a hydrocarbon reforming catalyst, including as a steam reforming and/or partial oxidation catalyst; and/or (g) a high temperature water splitting catalyst to give $H_2$.

In a fifth aspect of the invention, there is provided a catalyst article comprising the composition as hereinbefore defined, wherein the catalyst article is a ;TWC, a (coated) gasoline or diesel particulate or soot filter, a lean $NO_x$ trap for diesel aftertreatment, a PNA, a DOC, a water-gas shift catalyst, a hydrocarbon reforming catalyst, a steam reforming catalyst, a partial oxidation catalyst; and/or a high temperature water splitting catalyst.

BRIEF DESCRIPTION OF THE DRAWINGS

The present application is further understood when read in conjunction with the appended drawings. For illustrating the subject matter, there are shown in the drawings exemplary embodiments of the subject matter; however, the presently disclosed subject matter is not limited to the specific methods, processes, devices, and systems disclosed. In addition, the drawings are not necessarily drawn to scale. In the drawings.

DETAILED DESCRIPTION OF THE INVENTION

The present invention may be understood more readily by reference to the following description taken in connection with the accompanying Figures and Examples, all of which form a part of this disclosure. It is to be understood that this invention is not limited to the specific products, methods, processes, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this specification, claims, and drawings, it is recognized that the descriptions refer to compositions and processes of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

The present disclosure is directed to compositions comprising Ce-containing crystalline mixed oxides, methods of making and using such compositions, and catalyst articles comprising these compositions.

Methods for making compositions comprising the crystalline mixed oxides as described herein are further aspects of the present disclosure. Certain of these methods include those useful for preparing any crystalline mixed oxide described or suggested herein. In preferred methods of the invention, the method comprises:

(a) subjecting oxide precursors of the Ce, the one or more of Zr, Hf, Ti, Sn or Ge and the optional Y and/or one or more other rare earth metals, exclusive of Ce to reduction conditions to form a reduced form of the crystalline mixed oxide, particularly wherein the Ce is present in a +3 oxidation state;

(b) optionally holding the composition at a temperature to allow for the (re-)distribution of the Ce; and (c) optionally oxidizing the reduced form of the crystalline mixed oxide to form the crystalline mixed oxide.

Preferred reduction conditions are a carbothermal reduction, a hydrogen reduction, a carbon monoxide reduction, a methane reduction, or mixtures of any two or more of these reduction conditions. Carbothermal reduction and hydrogen reduction are particularly preferred.

Further preferred methods include those where the oxide precursors of the Ce, the one or more of Zr, Hf, Ti, Sn or Ge and the optional Y and/or one or more other rare earth metals, exclusive of Ce are deposited onto a high surface carbon support before subjecting the supported oxide precursors to the reduction conditions.

Compositions

Compositions of the invention comprise a crystalline mixed oxide comprising (a) Ce, and optionally Y and/or one or more other rare earth metals, exclusive of Ce; and (b) one or more M elements comprising Zr, Hf, Ti, Sn or Ge or a combination thereof. The Ce is evenly distributed through the lattice of the crystalline mixed oxide. In some such compositions, the lattice contains at least portions wherein the Ce is less evenly distributed, such that the crystalline mixed oxide, in its entirety or in portions thereof, contains localized concentrations of the Ce. Such a concentration difference can be described in terms of a Ce—Ce CN and its nearness to the theoretical minimum value for the corresponding composition assuming perfect Ce distribution. In further aspects of the invention, the crystalline mixed oxide is defined in terms of its methods of making, for example by reduction (e.g., carbothermal or hydrogen reduction) of the corresponding oxide precursors, the relative proportions of the oxide components within the scope of the described compositions, the particle size and/or surface areas of the crystalline mixed oxides, and/or the crystalline phase and phase purity of the crystalline mixed oxides.

The composition of the invention comprises, consists, or consists essentially of a crystalline mixed oxide having a stoichiometry of $Ln_y Ce_x M_w O_z$; where $0.15 \leq x \leq 0.5$; $y \leq 0.25$; $w = (1-x-y) \geq 0.5$; and $z = (2x+2w+1.5y)$;

M is Zr, Hf, Ti, Sn or Ge or a combination thereof;

Ln is Y and/or one or more rare earth metals, exclusive of Ce.

Compositions of the invention include those where the Ce is distributed substantially evenly throughout the crystalline mixed oxide lattice and those where the crystalline mixed oxide lattice contains, at least in part, localized concentrations of the Ce, such as described elsewhere herein.

The crystalline mixed oxide may preferably be substantially free of other materials. The crystalline mixed oxide may contain dopants such as Mg, Ca, and Sc to the extent that the presence of these dopants does not affect the nature of the phase of the crystalline material.

Preferably the M element is or comprises Zr or Hf, or a mixture or combination thereof.

Preferably Ln is or comprises Y, La, Nd, Pr, Gd, Sm, or a combination thereof. Particularly preferably, M is Zr and/or Hf and Ln is La, Nd, Pr, and/or Y.

The crystalline mixed oxide of the invention may be described in terms of porosity arising from the aggregation or agglomeration of the crystalline mixed oxides (e.g., comprising mesopores and macropores). The crystalline mixed oxide may also be defined in terms of its surface area. In this latter regard, the crystalline mixed oxide may have a surface area in a range of from about 10 $m^2g^{-1}$ to about 200 $m^2g^{-1}$, preferably from 20 $m^2g^{-1}$ to about 100 $m^2g^{-1}$, or may be defined in terms of any sub-range thereof, as described elsewhere herein. The crystalline mixed oxide preferably has a crystallite size of 200 nm or less, more preferably 100 nm or less, or any other size described elsewhere herein.

The crystalline mixed oxide may be present independently as a cubic or tetragonal phase. The crystalline phase of the crystalline mixed oxide may contain some pyrochlore or monoclinic phase. Preferably, however, the crystalline mixed oxide is substantially free of pyrochlore and/or monoclinic phases. As used herein, the term "pyrochlore phase" means a discrete pyrochlore phase which is distinguished by significant intensity of the 14° 2θ peak in the X-Ray Diffraction (XRD) pattern. As one potential measure of the ordering of the cation lattice arrangement, the crystalline mixed oxide preferably exhibits a powder X-Ray Diffraction (PXRD) pattern, wherein the ratio of the intensities of the diffraction lines at 2θ=14.5±0.5° and at 2θ=29.5±1 ($I_{14.5}/I_{29.5}$) is less than 0.02.

Preferably, the crystalline mixed oxide has a Ce—Ce CN that is within 20%, preferably 15%, more preferably 10%, or still more preferably 5%, or less of the theoretical minimum value for the corresponding composition assuming perfect Ce distribution.

Preferably, the crystalline mixed oxide is stable to environmental stresses, such as thermal stresses in air, wherein the stability is measured as the crystalline mixed oxide exhibiting a change of, for example, less than 5% of its Ce—Ce CN after exposing the crystalline mixed oxide to a temperature of at least 600° C. in air for two hours.

For example, the composition of the invention may be used in (a) gasoline and diesel after-treatment systems, such as in TWC or (coated) gasoline or diesel particulate or soot filters); (b) a lean $NO_x$ trap for diesel after-treatment system; (c) a PNA, (d) a DOC; (e) a Water-Gas Shift catalyst; (f) a hydrocarbon reforming catalyst, including as a steam reforming and/or partial oxidation catalyst; and/or (g) a high temperature water splitting catalyst to give $H_2$. The compositions, methods of use, and systems using such methods are all seen as independent embodiments within the scope of the present disclosure.

One aspect of the present invention is a composition comprising a crystalline mixed oxide comprising (a) Ce, and optionally Y and/or one or more other rare earth metals; and (b) one or more M elements comprising Zr, Hf, Ti, Sn or Ge or a combination thereof. The present inventors have found that the distribution of Ce atoms in the crystalline mixed oxide lattice has certain beneficial attributes on the use of these materials, especially for oxygen storage applications. In some embodiments, Ce is distributed through the lattice of the crystalline mixed oxides substantially evenly. In other embodiments, the lattice contains at least portions wherein the Ce is less evenly distributed, such that the crystalline mixed oxide, in its entirety or in portions thereof, contains localized concentrations of the Ce. An important figure of merit in such considerations is the Ce—Ce CN of the material and its nearness to the theoretical minimum value for the corresponding composition assuming perfect Ce distribution. The crystalline mixed oxide may be defined in terms of its method of making, for example by hydrogen or carbothermal reduction of the corresponding oxide or mixed oxide precursors, the relative proportions of the oxide components, the particle size and/or surface areas of the crystalline mixed oxides, and/or the crystalline phase and phase purity of the crystalline mixed oxides.

The compositions considered within the present disclosure include those crystalline mixed oxides comprising
  (a) Ce, and optionally Y and/or one or more other rare earth metals, exclusive of Ce; and
  (b) one or more M elements that is Zr, Hf, Ti, Sn or Ge or a combination thereof.

The compositions discussed herein may further comprise one or more dopants, for example Mg, Ca, and/or Sc.

Additionally, it should also be appreciated that any compositions described herein may also include adventitious impurities, such that any reference to this or any other stoichiometry is intended to accommodate these impurities; as such, the mixed oxide may be seen as having (i.e., consisting of) or consisting essentially of the stoichiometries described herein.

As described elsewhere herein, an important feature of compositions of the invention is the distribution of the Ce throughout the lattice of the mixed oxide. In some embodiments, the Ce is evenly distributed throughout the lattice. The compositions may contain localized concentrations of the Ce. The extent of the evenness of the Ce distribution, and the methods of determining the degree of the evenness of this distribution, are described elsewhere herein.

In terms of the general content of M elements, which may include one or more transition metal elements (though the inclusion of one or more of Zr, Hf, Ti, Sn or Ge is particularly preferred), these can be generally present such that the ratio of the Ce to any one or more of the M elements can vary from 1:5.7 to 1:1. In particularly preferred compositions, the M element is (i.e., consists of) or comprises Zr.

In terms of the rare earth elements, inclusive of Y, the term "optionally" refers to the fact that these elements, are either present or absent. Y is sometimes, but not always, considered a lanthanide element, but for the sake of absolute clarity, it is defined as such herein. The benefit of Ln inclusion is an improved resistance to reclustering of Ce within the structure under high temperature oxidizing conditions.

In a further aspect of the invention, the composition is obtained or obtainable by the reduction of appropriate precursors, either by hydrogen or other reducing gas mixture or by carbothermal reduction, the methods and precursors being described herein.

The compositions of the invention comprise a crystalline mixed oxide having a stoichiometry of $Ln_yCe_xM_wO_z$; where
  $0.15 \leq x \leq 0.5$, $y \leq 0.25$, $w = (1-x-y) \geq 0.5$, and $z = (2x+2w+1.5y)$;
  M is Zr, Hf, Ti, Sn or Ge or a combination thereof;
  Ln is Y and/or one or more rare earth metals, exclusive of Ce.

As described above, the M element may be or may comprise Zr or Hf, or a mixture or combination thereof. Ln may be or may comprise Y, La, Nd, Pr, Gd, or Sm. In preferred compositions, M is Zr or Hf and Ln is La, Nd, Pr, Gd, Sm, and/or Y.

As discussed elsewhere herein, within these frameworks, the Ce is distributed substantially evenly throughout the crystalline mixed oxide lattice. The crystalline mixed oxide may contain, at least in part, localized concentrations of the Ce. The benefit of having evenly distributed Ce versus local Ce clustering within the structure is improved oxygen storage capacity for the mixed oxide. Further, during certain stresses encountered in the use of these materials, Ce atoms may migrate within the lattice by various mechanisms. In part, this is the result of an increased difficulty for the Ce atoms to collect into local concentrated "islands." By maximizing the initial distribution of these Ce atoms in the lattice, the longevity of optimal performance is sustained.

The degree of ordering (or "evenness" of distribution) can be quantified in terms of the Ce—Ce (or Ce—O—Ce) coordination number within the crystalline mixed oxide, and especially in terms of the approach to the theoretically perfect distribution. This represents a measure of the degree of ordering (or mixing) of Ce within the cation sub-lattice of the structure. In a perfectly mixed lattice (e.g. of a binary mixed oxide) the Ce should have the minimum number of Ce—O—Ce near neighbours and conversely the maximum number of Ce—O-M-element near neighbours. An increase over this minimum represents incomplete mixing (or nano-clustering of the Ce within the structure).

The theoretical minimum Ce—O—Ce value for a given composition is determined by reference to pure $CeO_2$. $CeO_2$ has a face centered cubic structure and each Ce has 8 O near neighbours and 12 Ce next near neighbours. Therefore, for example for a perfectly mixed $Ce_{0.5}Zr_{0.5}O_2$ structure, half the Ce next near neighbours are replaced by Zr, hence a Ce—Ce CN of 6 (likewise, in a structure described herein in terms of $Ln_yCe_xM_wO_z$; where $x=0.5$, these conditions are also met, albeit where the next nearest neighbors are Ln or M elements). Therefore, a Ce—Ce CN of 7.8 represents an incomplete mixed lattice as the Ce—Zr CN will be only 4.2. The local structure of this material would contain nano-domains of Ce-rich and Zr-rich regions within individual crystallites. This incomplete mixing is difficult to extract from the XRD powder patterns. The only feature that is useful is the extra superlattice reflections that develop from a well-ordered structure as the Ce and Zr cation sub-lattices develop an ordered interpenetrating arrangement which results in extra diffraction reflections. Further, the ordering can also be measured by a combination of X-ray diffraction and X-ray Absorption spectroscopy [specifically Extended X-ray Absorption Fine Structure (EXAFS) or by X-ray scattering using Pair Distribution Function (PDF) analysis]. This ordering may therefore be defined in terms of at least one of these methods.

Preferably, the crystalline mixed oxide has a Ce—Ce CN, as described herein that is within 20%, 18%, 16%, 15%, 14%, 13%, 12%, 11%, 10%, 9%, 8%, 7%, 6%, 5%, 4%, 3%, 2%, or 1% of the theoretical minimum value for the corresponding composition assuming perfect Ce distribution. This coordination can be measured macroscopically or in specific regions of the crystalline mixed oxide.

In some crystalline mixed oxides as described herein, the stability of the crystalline mixed oxide may be defined in terms of the change of the CN after the mixed oxide is subjected to certain thermal, reductive, and/or oxidative stresses. Some preferred compositions therefore comprise crystalline mixed oxides that exhibit a change in its Ce—Ce CN of less than 20%, 15%, 10%, 8%, 6%, 5%, or 4%, relative to the original Ce—Ce CN, after exposure to a temperature in a range of from 400 to 1200° C., preferably from 500 to 1100° C., in air, for between 1 and 10 hours.

Particularly preferred compositions include, for example, a change of less than 5% after exposure in air to a temperature in a range of from 600° C. to 800° C., for 4 hours or less than 8% after exposure in air to a temperature in a range of from 400° C. to 900° C. for 5 hours.

Nano-clustering or even macro-clustering occurs in Ce-containing mixed oxide materials prepared by grinding, mixing, and sintering component oxides. Such methods necessarily lead to incomplete, or at least less than complete, or "perfect," mixing, resulting in localized areas of residual ceria having concentration of higher levels of Ce—O—Ce near neighbors. Ce containing mixed oxide materials can also be made by other routes such as co-precipitation, but here again, unless special precautions are taken in the synthesis, localized regions of imperfect mixing can occur. For example, if the Ce content is less than or equal to 50 mol % and the Ce is evenly distributed within the lattice, no more than half of the cations neighbouring each Ce atom should theoretically be Ce. Although such samples, by careful control of preparation conditions, may be single phase as determined by X-ray diffraction, they almost always contain regions of imperfect mixing and Ce is clustered to a greater or lesser extent. For some specific Ce containing mixed oxide chemical compositions, perfect dispersion of Ce within the structure manifests as a very high degree of cation sub-lattice ordering which is possible to see through the appearance of weak super lattice lines in XRD. However, in general, advanced characterisation which is sensitive to local structure is required to determine the extent of Ce—O—Ce neighbours and measure the Ce distribution within the structure.

The crystalline mixed oxide of compositions of the present invention is typically present in a tetragonal phase, a cubic phase, or a combination thereof. Within these compositions, the mixed oxide preferably contains less than 10%, 5%, 3%, 2%, 1%, or 0.5% of a pyrochlore phase. Preferably, the crystalline mixed oxide is substantially or essentially free of a pyrochlore phase (e.g., a pyrochlore phase is undetected by PXRD analysis).

In some preferred compositions, the compositions are characterized in terms of the ratio of diffraction line intensities of the crystalline mixed oxide. This offers insight into the nature of phase purity and ordering in the crystal lattice. In some embodiments, the mixed oxides exhibit diffraction peaks in their PXRD pattern at $2\theta=14.5\pm0.5°$ and $2\theta=29.5\pm1°$. Recognizing the potential effects of experimental artifacts in using peak intensities (e.g., sample preparation, sample packing, crystallite size, etc.), the inventors have found one useful figure of merit to be the ratio of these two peaks. The ratio of reflections refers to the proportion of ordering in the cation lattice arrangement. The reflection at $14.5\pm0.5°$ indicates the formation of a superlattice arrangement of cations within the overall cation sub-lattice. The greater the intensity of this reflection, relative to that at $29.5\pm1°$, the greater the degree of ordering in the structure. In certain embodiments, the ratio of diffraction line intensities at $2\theta=14.5\pm0.5°$ (designated $I_{14.5}$) and $2\theta=29.5\pm1°$ (designated $I_{29.5}$) ($I_{14.5}/I_{29.5}$) is less than 0.1, less than 0.08, less than 0.07, less than 0.06, less than 0.05, less than 0.04, less than 0.03, less than 0.02, less than 0.01, or less than 0.005. Preferably, this ratio is less than 0.02, particularly preferably less than 0.01, or substantially 0. Other patents on CeZr materials with bulk ordering place a minimum requirement on this ratio as an indication that the bulk structure of the material is sufficiently ordered.

The crystalline mixed oxide of compositions as described herein typically has a crystallite size in a range from about 1 nm to about 250 nm, preferably from about 1 nm to about 100 nm, e.g., from about 10 nm to about 25 nm. Crystallite sizes are estimated from line broadening of reflections in XRD patterns (using Reitveld analysis). This approach measures the unit cell repeat distance in the specific direction of the reflections lattice plane. These distances can also be confirmed by TEM, but the use of TEM as a primary measuring approach is less preferred due to poor particle counting statistics.

These nanoscale crystallites may also aggregate or agglomerate into large particle sizes. Typically, in these cases, the aggregates or agglomerates are disordered in macrostructures, at least with respect to the crystallite orientation, with mesoporous or macroporous pores penetrating throughout the aggregate. Preferably, the particles of these crystalline mixed oxides, either as crystallites or aggregates, have surface areas in a range of from about 5 $m^2g^{-1}$ to about 200 $m^2g^{-1}$, preferably from about 10 $m^2g^{-1}$ to about 100 $m^2g^{-1}$. These surface areas are most conveniently measured by inert gas (e.g., nitrogen or argon) porosimetry and analyzed using BET equation. Where specific values are cited herein, these can be seen as obtained using $N_2$ at 77 K on a 3Flex surface characterization analyzer (Micromeritics).

Preferably, the particles of these crystalline mixed oxides, either as crystallites or aggregates, have surface areas of greater than about 10 $m^2g^{-1}$. The benefit of particles having a surface area of 10 $m^2g^{-1}$ or above is that there are some support sites available to access the oxygen storage function, or to anchor a transition metal or other elemental promoter (e.g., Pt, Pd, or Rh) that can then catalyse the oxygen storage function, i.e. improve the rate of oxygen transfer in and out of the structure and therefore lead to enhanced performance, or other catalytic function.

The compositions described herein may also further comprise a transition metal or transition metal oxide catalyst distributed on a surface of the crystalline mixed oxide and/or within the pores of the aggregated or agglomerated crystalline mixed oxide particles. While the full breadth of the term transition metal and/or transition metal oxide are defined elsewhere herein, such materials preferably comprise at least one metal and/or oxide thereof (including physical mixtures or alloys) of at least one of Cr, Fe, Ru, Os, Co, Rh, Jr, Ni, Pd, Pt, Cu, Ag, Au, or Zn. Such catalysts may be deposited chemically or by vapor deposition techniques as are known by those skilled in the art.

Methods for Making the Compositions

The disclosure to this point has focused on compositions, but further aspects of the invention also encompass methods of making the crystalline mixed oxides as described herein.

In some Ce-containing mixed oxides, the formation of Ce in the +3 oxidation state facilitates the facile and even distribution of the Ce by migration throughout the lattice of the crystalline mixed oxides. These principles can also be used to prepare Ce-containing crystalline mixed oxides in which the Ce is substantially evenly dispersed in the mixed oxide lattice from oxide precursors or to re-distribute Ce within existing crystalline structures. As shown in the Examples, preparing and locking Ce in +3 oxidation state via formation of a specific highly ordered phase or via reductive thermal treatment of a pre-formed single phase mixed oxide e.g., treatment of $Ce_{0.5}Zr_{0.5}O_2$ with hydrogen at temperature at or above 900° C. However, such reductive thermal treatment by $H_2$ is more difficult to control and can lead to significant collapse of surface area. An improvement to this disclosure additionally covers the formation of a higher surface area ordered structure by means of co-precipitation of a Ce mixed oxide onto a high surface area carbon support. The reductive thermal treatment can then be performed (either with $H_2$ or preferably in a carbothermal mode where a portion of the carbon support acts as the reductant) and the surface area of the mixed oxide therefore does not collapse. The carbon support can then be removed by treatment in air at a temperature that will not cause significant sintering.

In the context of this disclosure, then, one aspect of the invention is a method of re-distributing the Ce atoms within an initial Ce-containing mixed oxide composition to provide a final Ce-containing mixed oxide composition having a Ce—Ce CN that is within 20%, 15%, 10%, 5%, or less of the theoretical minimum value for the corresponding composition assuming perfect Ce distribution, the initial Ce-containing mixed oxide comprising
(a) Ce, and optionally Y and/or one or more other rare earth metals, exclusive of Ce; and
(b) one or more M elements that is Zr, Hf, Ti, Sn or Ge or a combination thereof;
the method comprising:
(a) subjecting the initial mixed oxide to reducing conditions to form a reduced form of the crystalline mixed oxide; and
(b) oxidizing the reduced form of the crystalline mixed oxide to form the final Ce-containing crystalline mixed oxide.

In such methods, the elemental composition of the Ce-containing mixed oxide before and after treatment is essentially the same, the difference between initial and final being only the distribution of the Ce in the lattice, the Ce being more evenly distributed (the Ce—Ce CN being closer to the theoretical value) after treatment than before. The extent of the evenness of the Ce distribution, and the methods of determining the degree of the evenness of this distribution, are described elsewhere herein.

In preferred methods of the invention, the Ce-containing mixed oxide composition has a stoichiometry of $Ln_yCe_xM_wO_z$; where $0.15 \leq x \leq 0.5$, $y \leq 0.25$, $w=(1-x-y) \geq 0.5$, and $z=(2x+2w+1.5y)$;

M is Zr, Hf, Ti, Sn or Ge or a combination thereof;
Ln is Y and/or one or more rare earth metals, exclusive of Ce.

Preferably, the reducing conditions comprise treating the initial mixed oxide with hydrogen at elevated temperature. In other preferred methods of the invention, the reducing conditions comprise subjecting the initial crystalline mixed oxide to carbothermal reduction conditions.

A further aspect of the invention is a method for making a crystalline mixed oxide as hereinbefore described, the method comprising:
(a) subjecting oxide precursors of the Ce, the one or more of Zr, Hf, Ti, Sn or Ge and the optional Y and/or one or more other rare earth metals, exclusive of Ce, to reduction conditions to form a reduced form of the crystalline mixed oxide; and
(b) optionally oxidizing the reduced form of the crystalline mixed oxide to form the crystalline mixed oxide.

Preferred reduction conditions are a carbothermal reduction, a hydrogen reduction, a carbon monoxide reduction, a methane reduction, or mixtures of any two or more of these reduction conditions. Carbothermal reduction and hydrogen reduction are particularly preferred.

In preferred methods, the oxide precursors of the Ce, the one or more of Zr, Hf, Ti, Sn or Ge and the optional Y and/or one or more other rare earth metals, exclusive of Ce, are deposited onto a high surface carbon support before subjecting the supported oxide precursors to the carbothermal reduction conditions.

As described herein, a carbothermal reduction relies on the use of carbon as a reducing agent rather than a gas-phase reductant (like $H_2$ or CO). Deposition of the mixed oxide precursor onto a suitable high surface carbon support allows good contact between the carbon and the oxide precursor particle. Treatment of the resulting mixture under inert conditions both crystallizes and reduces the mixed oxide to give a supported reduced composition (although this is still an oxide, just a reduced form). It is most easily done by precipitating the individual components together as amorphous hydrous oxides/hydroxide/carbonates on the carbon by e.g. co-precipitation of soluble salts with base. It has been shown the literature that this is a convenient route to order the composition as the carbon reduces the Ce from 4+ to 3+ and the ionic radii size mismatch between the $Ce^{3+}$ and the main M element cation drives ordering. Treating the resulting material in air or other oxygen-containing atmospheres to moderate temperatures removes the carbon support through combustion and oxidizes the $Ce^{3+}$ back to $Ce^{4+}$ while retaining the ordered or re-ordered structure. The carbon is also essential to keep the particles separated during the reduction process to preserve the surface area (and restrict crystallite size growth through thermal sintering)

The carbothermal treatment is not easily applied to pre-formed crystalline oxide materials, especially commercial oxide materials that have larger crystallite sizes, as it is difficult to disperse already crystalline materials onto carbon. Amorphous/hydrous metal oxides or carbonates are useful precursors.

Suitable sources of carbon include preformed amorphous carbon powders, including activated carbon powder, carbon black, carbon soot, and lampblack, and/or can be derived from commercial sources or from polymers decomposed or pyrolized under non-oxidizing conditions to form carbonaceous materials. Highly dispersed amorphous materials favour the intimate mixing needed, or at least preferred, for these syntheses. Particularly preferred sources of carbon are high purity carbons, as it may be desirable to minimize the amounts of inorganic residue in the final crystalline mixed oxide material. Examples of high purity carbons of this type include acetylene blacks and extra conductive blacks (e.g., KETJENBLACK).

Typical crystalline oxide precursor sources of the Ce, M elements or Ln metals include alkoxides (e.g., $C_{1-6}$ alkoxides), hydroxides, hydrous oxides, hydrogels, fumed or colloidal oxides, or combinations thereof. Additionally, any oxidized salt of these metals or elements, such as those comprising beta-diketonates (e.g., acetylacetonates, or "acac"s), alkyl substituted beta-diketonates (e.g., such as 2,2,6,6-tetramethyl-3,5-heptanoates), carbonates, carboxylates (e.g., acetate, propionate, 2-ethylhexanoate, octanoate), halide, hydroxide, nitrate, oxalates, and/or sulfate, such as are known for use in sol-gel synthesis, may serve as appropriate precursors, though use of precursors without halides or sulfur are preferred. Likewise, though while more expensive, precursors useful for atomic layer deposition are also useful in this regard, for example metals comprising dialkylamino alkoxides (e.g., dimethylaminoethoxide), optionally substituted formamides or dialkyl or diaryl amides ($-NR_2$, where R is alkyl such as methyl, ethyl, (iso)propyl or aryl such as phenyl).

For the avoidance of doubt, every combination of each element or metal described herein (including at least Ce, Zr, Hf, Ti, Sn, Ge, Y, La, Pr, Nd, Sm, Eu, Gd, Tb, Dy, Ho, Er, Tm, Yb, and Lu, or any transition metal material) with any of the foregoing precursor types, or combination thereof, may be present in the oxide precursor or crystalline oxide precursor described as used or useful herein.

The carbon and the (crystalline) oxide precursors may be intimately mixed by physical methods, or the carbon may be mixed with the (crystalline) oxide precursor sources during the formation of the latter (e.g., captured in a sol-gel lattice during the sol-gel processing of the (crystalline) oxide precursors). Alternatively, the (crystalline) oxide precursors may be sprayed or otherwise deposited onto the carbon sources.

Typical conditions employed for the carbothermal reduction include heating (and holding) the intimately mixed (crystalline) oxide precursor and carbon at a temperature in a non-oxidizing atmosphere at a temperature in a range of from 350° C. to 1100° C., preferably from 350° C. to 850° C. The treatment regimes should be sufficient to reduce the fully oxidized forms of the elements or metals to a lower valence state material, but not so much as to reduce any to their elemental or carbide forms.

The resulting reduced form of the crystalline mixed oxide is oxidized to form the crystalline mixed oxide by suitable chemical methods. Such suitable chemical methods can include, for example, treatment at elevated temperatures in the presence of oxygen and/or an organic or hydrogen peroxide material for a time and under such conditions sufficient to form the crystalline mixed oxide. This oxidation can be conducted at a temperature in a range of from 350° C. to 1100° C., preferably from 350° C. to 850° C. Preferably, the components in the crystalline mixed oxide are fully oxidized, have particle sizes and characteristics as described elsewhere herein, and/or the carbon is fully combusted.

Uses of the Compositions

This disclosure also considers within its scope the use of any one of the compositions described herein in any method, catalyst, or system used for the transformations described herein. Ce/Zr systems are known to be useful as oxygen storage systems, and it is contemplated that the presently defined compositions will be useful and provide specific advantages to previously reported Ce/Zr systems in this regard. Such mixed oxide systems are also useful more generally in the context of oxidation, reduction, reforming, water splitting, water-gas shift catalysts, both in their own rights and in the context of large systems. Each of these catalyst forms and systems are considered separate embodiments of the present disclosure.

These abilities also provides the basis for including within the scope of the present disclosure such applications as (a) gasoline or diesel after-treatment systems, such as in TWC or (coated) gasoline or diesel particulate and/or soot filters; (b) a lean $NO_x$ trap for diesel after-treatment system; (c) a PNA, (d) a DOC; (e) a Water-Gas Shift catalyst; (f) a hydrocarbon reforming catalyst, including as a steam reforming and/or partial oxidation catalyst; and/or (g) a high temperature water splitting catalyst to give $H_2$.

Use of the compositions of the invention in TWC as described above is particularly preferred.

Oxygen Storage Compositions and Materials

Ceria ($CeO_2$) based oxygen storage component materials are key components in treating emissions from an engine. Ceria has also been used as a support for palladium (Pd), platinum (Pt) and rhodium (Rh) in treating hydrocarbon and NOx emissions from gasoline and diesel vehicles. One important property of ceria-based OSC materials is the ability of ceria to switch between the +4 and +3 oxidation states. This redox property makes ceria-based materials useful for various emissions treatment applications. As such, the compositions of the present disclosure are useful in these applications.

Three-Way Catalyst (TWC) Articles

For reasons that are well known in the art, TWCs have been developed to incorporate a component which stores oxygen during leaner periods of the operating cycle, and releases oxygen during richer periods of the operating cycle, thus extending the effective operating window. For such purposes, ceria-based (e.g., ceria-zirconia mixed oxides) materials are used in the majority of current commercial TWCs as oxygen storage components (OSC).

The compositions described herein are well-suited and offer significant advantages over other systems used for this purpose. In particular, the evenness of the distribution of the Ce in the mixed oxide compositions described herein, provides a level of stability and oxygen storage capability not recognized or realized by other materials that do not contain this feature.

Accordingly, one aspect of the present invention is directed to a catalyst article for treating exhaust gas comprising at least the crystalline mixed oxide compositions disclosed herein. Such a catalyst article may also comprise: a substrate; and a catalytic region on the substrate; wherein the catalytic region comprises a first platinum group metal (PGM) component and a composition comprising any one of the crystalline mixed oxides described herein, functioning as an OSC material. This catalyst article may also comprise an inorganic oxide support. Additional aspects of the invention also encompass exhaust systems for internal combustion engines. Still further aspects of the invention include a method of treating an exhaust gas from an internal combustion engine, in particular for treating exhaust gas from a gasoline engine. The method comprises contacting the exhaust gas with the catalyst article, e.g., the TWC article, of the invention.

In some preferred catalyst articles as described herein, the crystalline mixed oxide of the present disclosure comprises a mixed oxide comprising ceria, zirconia, and one or more of $La_2O_3$, $Nd_2O_3$, $Y_2O_3$, $Pr_6O_{11}$.

Within the context of this use, the first PGM is preferably palladium, platinum, rhodium, and mixtures thereof. More preferably, the first PGM is palladium. The catalytic region may further comprise a second PGM component that may be palladium, platinum, rhodium, and a mixture thereof. Particularly preferably, the second PGM component is rhodium if the first PGM component is palladium. The catalytic region may further comprise a third PGM component that may be palladium, platinum, rhodium, and a mixture thereof. Thus the catalytic region may comprise a trimetal PGM component, such as PtPdRh. Preferably, the catalytic region is essentially free of PGM metals other than the palladium component.

Also within this context, the OSC material can be in the range of 20-80%, based on the total weight of the catalytic region.

The catalytic region in this context may comprise further components that are known to the skilled person. For example, the compositions of the invention may further comprise at least one binder and/or at least one surfactant. Where a binder is present, dispersible alumina binders are preferred.

Also within this context, the substrate can be a metal or ceramic substrate. Preferably the substrate is a flow-through monolith or a filter monolith. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

Gasoline and Diesel Particulate Filters and Catalyzed Soot Filters

Compression ignition type internal combustion engines are also known to generate particulate matter by incomplete combustion of the fuels used therein, as are particulate traps for trapping such particulate matter in the exhaust gas in an exhaust passage. The purpose of these traps or filters, in the context of exhaust purification systems, is to suppress the amount of particulate matter which is released into the atmosphere. Such filter systems often comprise structures comprising mixed oxides such as alumina, silica-titania, titania-zirconia, silica-zirconia, silica-gallium oxide, titania-alumina, silica-yttrium oxide, alumina-zirconia, silica-lanthanum oxide, titania-cadmium oxide, titania-stannous oxide, titania-zinc oxide, zinc oxide-silica, and zinc oxide-cadmium oxide. As such, the present compositions and mixed oxide systems are particularly suitable for this application and filters comprising the compositions described herein are also considered a part of the present disclosure.

When used in the context of the TWC systems discussed above, in an exhaust system comprising both features, the particulate filter may be located either upstream or downstream of the three-way catalyst. The TWC may, additionally or alternatively, be present on a particulate filter.

Diesel Oxidation Catalysts

Both diesel and gasoline engines produce to different degrees exhaust emissions that generally contains at least four classes of pollutant that are legislated against by inter-governmental organisations throughout the world: CO, unburned HCs, $NO_x$, and particulate matter (PM). Emissions standards for both type of engines, whether stationary or mobile (e.g., vehicular engines), are being progressively tightened. There is a need to provide improved catalysts and exhaust systems that meet these standards, which are cost-effective.

Oxidation catalysts, such as diesel oxidation catalysts (DOCs), typically oxidise CO and HCs in an exhaust gas produced by a diesel engine. Diesel oxidation catalysts can also oxidise some of the nitric oxide (NO) that is present in the exhaust gas to nitrogen dioxide ($NO_2$). Even though $NO_2$ is itself a pollutant, the conversion of NO into $NO_2$ can be beneficial. The $NO_2$ that is produced can be used to regenerate PM that has been trapped by, for example, a downstream diesel particulate filter (DPF) or a downstream catalysed soot filter (CSF). Generally, the $NO_2$ generated by the oxidation catalyst increases the ratio of $NO_{2b}$:NO in the exhaust gas from the outlet of the oxidation catalyst compared to the exhaust gas at the inlet. This increased ratio can be advantageous for exhaust systems comprising a downstream selective catalytic reduction (SCR) catalyst or a selective catalytic reduction filter (SCRF™) catalyst. The ratio of $NO_2$:NO in the exhaust gas produced directly by a diesel engine may be too low for optimum SCR or SCRF catalyst performance.

At least in this context, embodiments include those oxidation catalysts comprising one or more transition metal catalysts, preferably a platinum group catalyst. In some embodiments, the catalytic metal independently includes any one or more of Pd, Pt, Rh, gold (Au), silver (Ag), iridium (Jr), ruthenium (Ru) and mixtures of two or more thereof.

These catalysts may be incorporated into exhaust systems, in which case the exhaust system and the stationary or mobile (e.g., vehicle) exhaust generator comprising the exhaust system are considered to form a part of the present disclosure. It should also be appreciated that the use of these materials as oxidation catalysts are not limited to use in diesel systems, or even internal combustion systems, but also in other chemical process oriented systems, such as volatile organic compound (VOC) destruction, HC processing and clean up, water-gas shift (WGS) reactions, or partial selective oxidation of CO in e.g. syngas

Lean $NO_x$ Traps for Diesel After-treatment

The use of in-line $NO_x$ storage units, often called Lean NOx Traps but now more commonly called $NO_x$ traps or $NO_x$ Absorber Catalysts (NAC), is now well known in exhaust gas aftertreatment systems for lean burn internal combustion engines. Possibly the earliest patent publication is Toyota's EP 0 560 991, which describes how a $NO_x$ storage unit may be constructed by incorporating materials such as barium oxide which react with NOx to form nitrates, and a $NO_x$ conversion catalyst such as platinum. The trap is periodically regenerated by modulating the fuel/air ratio (commonly called "lambda" or λ) to stoichiometric (λ=1) or rich (λ>1), so that $NO_x$ is released and simultaneously reduced by contact with the catalyst to nitrogen gas.

A conventional $NO_x$ trap is constructed by depositing $NO_x$ trapping components (e.g., alkali earth or rare earth materials, such as barium, neodymium, or lanthanum), and optionally OSC and catalytic components onto a honeycombed flow-through substrate monolith.

Compositions as defined herein may be useful as oxygen storage components in a lean $NO_x$ trap (LNT), e.g., a lean $NO_x$ trap for diesel after-treatment.

Definitions

In the present disclosure the singular forms "a," "an," and "the" include the plural reference, and reference to any particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally accepted meanings in the patent vernacular; that is, (i) "comprising," which is synonymous with "including," "containing," or "characterized by," is inclusive or open-ended and does not exclude additional, unrecited elements or method or process steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) of a process is the ability of any compositional variance within the crystalline mixed oxide to maintain its designated topology as well as to maintain the Ce—Ce coordination number within that crystalline mixed oxide to the levels described or claimed.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C." As a further example, a listing of "Pt, Pd, and/or Rh" includes the independent embodiments "Pt," "Pd," "Rh," "Pt and/or Pd," "Pt and/or Rh," "Pd and/or Rh," as well as "Pt, Pd, and/or Rh." Likewise, use of the symbols "≤" and "≥" refers to ranges in which the endpoint values are included in the range. But subsets of these ranges may also include those where one or both endpoint values are excluded. For example, the embodiment "0.15≤x≤0.5" refers to the range where the range is defined to include the endpoints 0.15 and 0.5. Separate independent embodiments include those where the range may be defined as "0.15<x≤0.5" or "0.15≤x<0.5" or "0.15<x<0.5."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Throughout this specification, words are to be afforded their normal meaning, as would be understood by those skilled in the relevant art. However, to avoid misunderstanding, the meanings of certain terms will be specifically defined or clarified.

The terms "Ce—Ce coordination number" and Ce—O—Ce coordination number" are used interchangeably to refer to the mean number of Ce atoms adjacent (with an intervening O) to any other Ce atom in the mixed oxide lattice.

The terms "halo" and "halogen" and the like are used in the conventional sense to refer to a chloro, bromo, fluoro, or iodo substituent.

Unless otherwise indicated, the term "isolated" means physically separated from the other components so as to be free of solvents or other impurities; additional embodiments include those where the compound is substantially the only solute in a solvent or solvent fraction, such a analytically separated in a liquid or gas chromatography phase.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

"Optional" or "optionally" means that the subsequently described circumstance may or may not occur, so that the description includes embodiments where the circumstance occurs and instances where it does not. For example, the term "optionally [containing] Y and/or one or more rare earth metals, exclusive of Ce" means that the Y and/or one or more the rare earth metals may or may not be present in the crystalline mixed oxide, the description includes where these materials are present and compositions where these materials are not present. Similarly, the phrase "optionally isolated" means that the target material may or may not be separated from other materials used or generated in the method, and, thus, the description includes separate embodiments where the target molecule or other material is separated and where the target material is not separated, such that subsequence steps are conducted on isolated or in situ generated product.

The acronym "PGM" as used herein refers to "platinum group metal". The term "platinum group metal" generally refers to Ru, Rh, Pd, Os, Ir, or Pt, preferably Ru, Rh, Pd, Ir, or Pt. The term "PGM" preferably refers to at least one of Rh, Pt, and/or Pd.

The terms "separating" or "separated" carry their ordinary meaning as would be understood by the skilled artisan, insofar as it connotes separating or isolating the product material from other starting materials or co-products or side-products (impurities) associated with the reaction conditions yielding the material. As such, it infers that the skilled artisan at least recognizes the existence of the product and takes specific action to separate or isolate it. Absolute purity is not required, though preferred, as the material may contain minor amounts of impurities and the separated or isolated material may contain residual solvent or be dissolved within a solvent used in the reaction or subsequent purification of the material.

As used herein, the term "crystalline mixed oxides" are crystalline structures comprising macroscopic compositions that are substantially uniform, whether the Ce atoms are uniformly distributed throughout or not.

Consistent with its traditional meaning, terms "transition metal" or "transition metal oxides" refer to the metals or oxides of an element in the d-block of the periodic table, which includes groups 3 to 12 on the periodic table. Such elements include Sc, Ti, V, Cr, Mn Fe, Co, Ni, Cu, Zn, Y, Zr, Nb, Mo, Ru, Rh, Pd, Ag, Cd, La, Hf, Ta, W, Re, Os, Jr, Pt, and Au.

Also consistent with its traditional meaning, as used herein, the term "rare earth metals" refer to those elements considered within the lanthanide and actinide series, but especially cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), and ytterbium (Yb). In some definitions, yttrium (Y) is also considered a rare earth element, but for the avoidance of doubt as to its potential inclusion to this category here, it is specifically listed throughout in this regard.

As used herein, the term "substantially free of" as used herein with reference to a material, typically in the context of a composition, means that the material in a minor amount, such as ≤5% by weight, preferably ≤2% by weight, more preferably ≤1% by weight. The expression "substantially free of" embraces the expression "does not comprise." The expression "essentially free of" as used herein means that the material in an even lesser, trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The following listing of specific Embodiments is intended to complement, rather than displace or supersede, the previous descriptions.

Embodiment 1. A composition comprising a crystalline mixed oxide comprising
(a) Ce, and optionally Y and/or one or more other rare earth metals, exclusive of Ce; and
(b) one or more M elements that is Zr, Hf, Ti, Sn or Ge or a combination thereof.

In some aspects of this Embodiment, the Ce is evenly distributed throughout the lattice. In other aspects, the composition contains localized concentrations of the Ce. The extent of the evenness of the Ce distribution, and the methods of determining the degree of the evenness of this distribution, are described elsewhere herein.

It should be appreciated that each of the M elements or combination thereof provides an independent aspect of this Embodiment. In specific aspects, the M element is or comprises Zr.

In independent aspects of this Embodiment, the Y and/or one or more rare earth metals, exclusive of Ce, are present or absent.

In one aspect of this Embodiment, each of the Ce, the one or more M elements, Y, and the one or more rare earth metals are in their fully oxidised valence state. In additional independent aspects of this Embodiment, one or more of these metals or elements are present in the composition in a partially oxidized state (i.e., less than fully oxidized).

In some independent aspects of this Embodiment, the composition is obtained or obtainable by the reduction (e.g., carbothermal or hydrogen reduction) of suitable precursors, the methods and precursors being described herein. That is, the use of such methods and the compositions derived or derivable therefrom are independent aspects of this disclosure, independent of the specific ratio of the components described herein.

For the sake of brevity and clarity, each of the features described as aspects for a given Embodiment (in this case, Embodiment 1) is considered a sub-embodiment of that Embodiment, such that any subsequent Embodiment that refers back to a predecessor Embodiment also include those aspects as separate sub-embodiments in the latter Embodiment.

In addition to or complementing the aspects of Embodiment 1:

Embodiment 2. A composition comprising a crystalline mixed oxide having a stoiochiometry of $Ln_yCe_xM_wO_z$; where
  $0.15 \leq x \leq 0.5$, $y \leq 0.25$, $w=(1-x-y) \geq 0.5$, and $z=(2x+2w+1.5y)$;
  M is Zr, Hf, Ti, Sn or Ge or a combination thereof;
  Ln is Y and/or one or more rare earth metals, exclusive of Ce.

In one aspect of this Embodiment, the Ce is distributed substantially evenly throughout the crystalline mixed oxide lattice. In other aspects, the crystalline mixed oxide lattice contains, at least in part, localized concentrations of the Ce, such as described elsewhere herein. The nature and degree of this Ce distribution is evidenced by any suitable analytical method, but preferably by one or more of the methods described elsewhere herein.

In some aspects of this Embodiment, each of the components of the crystalline mixed oxide (i.e., the Ce, the one or more M elements, Y, and the one or more rare earth metals) are present in their fully oxidized valence state. Independently, the M metals may be present in their fully oxidized state; i.e., having a nominal +4 oxidation state. Additional independent aspects of this Embodiment, one or more of these metals or elements are present in the composition in a in a partially oxidized state (i.e., less than fully oxidized).

Embodiment 3. The composition of Embodiment 1 or 2, wherein the M element is or comprises Zr or Hf, or a mixture or combination thereof.

Embodiment 4. The composition of any one of Embodiments 1 to 3, wherein Ln is or comprises Y, La, Nd, Pr, Gd, or Sm. In certain preferred aspects of these Embodiments, M is Zr (or Hf) and Ln is La, Nd, Pr, or Y.

Embodiment 5. The composition of any one of Embodiments 1 to 4, wherein, wherein the crystalline mixed oxide is a mesoporous or macroporous aggregate or agglomerate.

Embodiment 6. The composition of any one of Embodiments 1 to 5, wherein the crystalline mixed oxide has a surface area in a range of from about 10 $m^2g^{-1}$ to about 200 $m^2g^{-1}$.

Embodiment 7. The composition of any one of Embodiments 1 to 6, wherein the crystalline mixed oxide has a crystallite size of 100 nm or less.

Embodiment 8. The composition of any one of Embodiments 1 to 7, wherein the crystalline mixed oxide is present in a tetragonal phase, a cubic phase, or a combination thereof. In certain aspects of this Embodiment, the crystalline mixed oxide contains less than 10%, 5%, 3%, 2%, 1%, or 0.5% of a pyrochlore phase. In other aspects, the crystalline mixed oxide is substantially free of a pyrochlore phase and/or a kappa phase (e.g., a pyrochlore phase is undetected by PXRD analysis).

Embodiment 9. The composition of any one of Embodiments 1 to 8, wherein the crystalline mixed oxide exhibits a PXRD pattern, wherein the ratio of diffraction line intensities at $2\theta=14.5\pm0.5°$ and $2\theta=29.5\pm1°$ ($I_{14.5}/I_{29.5}$) is less than 0.02.

Embodiment 10. The composition of any one of Embodiments 1 to 9, wherein the crystalline mixed oxide has a Ce—Ce CN that is within 20%, 15%, or 10% of the theoretical minimum value for the corresponding composition assuming perfect Ce distribution.

Embodiment 11. A method of preparing the crystalline mixed oxide of any one of Embodiments 1 to 10, the method comprising:

(a) subjecting oxide precursors of the Ce, the one or more of Zr, Hf, Ti, Sn or Ge and the optional Y and/or one or more other rare earth metals, exclusive of Ce to reduction conditions to form a reduced form of the crystalline mixed oxide; and (b) optionally oxidizing the reduced form of the crystalline mixed oxide to form the crystalline mixed oxide.

Embodiment 12. The method of Embodiment 11, wherein the oxide precursors of the Ce, the one or more of Zr, Hf, Ti, Sn or Ge and the optional Y and/or one or more other rare earth metals, exclusive of Ce are deposited onto a high surface carbon support before subjecting the supported oxide precursors to the carbothermal reduction conditions.

Embodiment 13. A method of re-distributing the Ce atoms within an initial Ce-containing mixed oxide composition to provide a final Ce-containing mixed oxide composition having a Ce—Ce CN that is within 20%, 15%, or 10% of the theoretical minimum value for the corresponding composition assuming perfect Ce distribution, the initial Ce-containing mixed oxide comprising (a) Ce, and optionally Y and/or one or more other rare earth metals, exclusive of Ce; and (b) one or more M elements that is Zr, Hf, Ti, Sn or Ge or a combination thereof; the method comprising:

(a) subjecting the initial mixed oxide to reducing conditions to form a reduced form of the crystalline mixed oxide; and (b) oxidizing the reduced form of the crystalline mixed oxide to form the crystalline mixed oxide.

In such methods, the elemental composition of the Ce-containing mixed oxide before and after treatment is essentially the same, the difference between initial and final being only the distribution of the Ce in the lattice, the Ce being more evenly distributed (the Ce—Ce CN being closer to the theoretical minimum value) after treatment than before. The extent of the evenness of the Ce distribution, and the methods of determining the degree of the evenness of this distribution, are described elsewhere herein.

In some aspects of this Embodiment, the Ce-containing mixed oxide composition has a stoichiometry of $Ln_yCe_xM_wO_z$; where $0.15 \leq x \leq 0.5$, $y \leq 0.25$, $w=(1-x-y) \geq 0.5$, and $z=(2x+2w+1.5y)$;

M is Zr, Hf, Ti, Sn or Ge or a combination thereof;

Ln is Y and/or one or more rare earth metals, exclusive of Ce.

In certain aspects of this Embodiment, the reducing conditions comprise subjecting the initial crystalline mixed oxide to carbothermal reduction conditions. In other aspects of this Embodiment, the reducing conditions comprise treating the initial mixed oxide with hydrogen at elevated temperature.

Embodiment 14. The use of any one of the compositions of Embodiments 1 to 10 in (a) gasoline after treatment systems, such as in TWC or coated Gasoline Particulate Filters (GPF)); (b) a lean $NO_x$ trap for diesel after-treatment system; (c) a PNA; (d) a DOC; (e) a Water-Gas Shift catalyst; (f) a hydrocarbon reforming catalyst, including as a steam reforming and/or partial oxidation catalyst; and/or (g) a high temperature water splitting catalyst to give $H_2$.

Embodiment 15. A catalyst system comprising the composition of any one of Embodiments 1 to 10, wherein the catalyst system is a TWC, a coated GPF, a lean $NO_x$ trap for diesel aftertreatment, a water-gas shift catalyst containing Cu, Pt, Au . . . , a hydrocarbon reforming catalyst, a steam reforming catalyst, a partial oxidation catalyst; and/or a high temperature water splitting catalyst.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein. All materials are commercially available and were obtained from known suppliers, unless noted otherwise.

In the following examples, efforts have been made to ensure accuracy with respect to numbers used (e.g., amounts, temperature, etc.) but some experimental error and deviation should be accounted for. Unless indicated otherwise, temperature is in degrees Celsius, and pressure is at or near atmospheric.

Materials

All materials are commercially available and were obtained from known suppliers, unless noted otherwise.

The materials produced in the examples described below and elsewhere herein were characterized or are characterized by one or more of the following analytic methods. PXRD patterns were collected on a Bruker D8 powder diffractometer using a CuKα radiation (40-45 kV, 40 mA) at a step size of 0.04° and a 1 s per step between 5° and 100° (2θ). Transmission electron microscopy (TEM) images were obtained on a JEM 2800 (Scanning) TEM with 200 kV Voltage. The micropore volume and surface area were measured using $N_2$ at 77 K on a 3Flex surface characterization analyzer (Micromeritics).

Strong Reduction Mild Oxidation (SRMO) conditions used in Examples below were as follows: The SR portion of the treatment was carried out in a flow through ceramic tube furnace. The powdered support was placed in the bottom of a high-sided alumina calcination boat with a shallow bed depth. The tube furnace was thoroughly flushed with $N_2$ to remove air before switching to 100% $H_2$ at a flow rate of approximately 800 mL/min. The furnace was ramped to the set temperature at a rate of 10° C./min (no holdback). The furnace was then held at the set temperature for 4 hrs under the same 800 mL/min 100% $H_2$ environment, after which the temperature was reset and the furnace allowed to cool uncontrolled to room temperature.

The MO portion of the treatment was carried out in a static oven. The furnace was ramped to 500° C. at a rate of 10° C./min (no holdback). The furnace was then held at the set temperature for 3 hrs, after which the temperature was reset and the furnace allowed to cool uncontrolled to room temperature.

OSC was determined by two methods:

Method 1: In a typical OSC experiment, 0.05 g of the sample was programmed to be cycled between oxidizing (50 mL min$^{-1}$ of 5% $O_2$/He) and reducing conditions (50 mL min$^{-1}$ of 100% CO), using 10 mL min$^{-1}$ Ar as a tracer gas and 40 mL min$^{-1}$ He as a carrier gas. A mass spectrometer was used to monitor the $CO_2$ and $O_2$ signals over multiple redox cycles and the OSC is calculated as the area under the $CO_2$ curve for the first 300 seconds from where the $CO_2$ starts to be produced.

Method 2: OSC of coated monolithic substrates was evaluated on a gasoline engine at mass flow rates of 30-70 kg h$^{-1}$ with a catalyst inlet temperature of 400° C. Lambda was cycled from 1.05 to 0.95, and OSC is reported as the time delay between the pre- and post-catalyst AFR sensors registering the change in lambda.

Example 1: $Ce_{0.5}Zr_{0.5}O_2$ particles were separately treated with air (OSC 1A) and hydrogen under SRMO conditions (OSC 1B) at 900° C. The SRMO treated particles (OSC 1B) had the following characteristics:
SSA: 25 m$^2$/g;
Crystallite size: 12 nm;
$I_{14.5}/I_{29.5}$: ~0.007
Theoretical minimum Ce—O—Ce CN: 6.0.

After treatment at 900° C. air for 4 hrs, the measured Ce—O—Ce CN in OSC 1A was found to be: 7.8±0.5 (30% of theoretical).

After treatment at 900° C. SRMO, the measured Ce—O—Ce CN in OSC 1B was found to be: 5.9±0.2 (variance from 0%).

Figure 1:
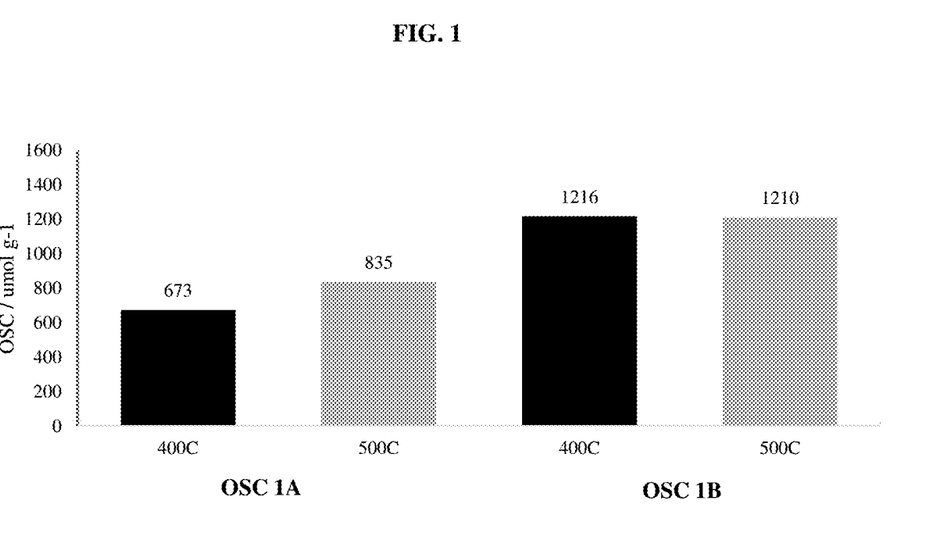
FIG. 1 shows the results of experiments described in Example 1.

The corresponding abilities to release $O_2$ by OSC Method 1 for OSC 1A and OSC 1B in FIG. 1. As shown in FIG. 1, the abilities to release $O_2$ at both 400° C. and 500° C. were substantially higher for OSC 1B having the Ce—O—Ce CN at or near the theoretical minimum, than OSC 1A having Ce—O—Ce CN further away from this minimum value.

Example 2: $La_{0.015}Nd_{0.045}Ce_{0.375}Zr_{0.565}O_{1.97}$ particles were separately treated with air (OSC 2A) and hydrogen under SRMO conditions (OSC 2B) at 900° C. The SRMO treated particles (OSC 2B) had the following characteristics:
SSA: 47 m$^2$/g;
crystallite size: 8 nm;
$I_{14.5}/I_{29.5}$: ~0.000; and
theoretical minimum Ce—O—Ce CN: 5.2.

After treatment at 900° C. air for 4 hrs, the measured C—O—Ce CN in OSC 2A was found to be: 6.6±0.4 (within 27% of theoretical).

After treatment at 900° C. SRMO, the measured Ce—O—Ce CN in OSC 2B was found to be: 5.7±0.3 (within 9% of theoretical).

Figure 2:
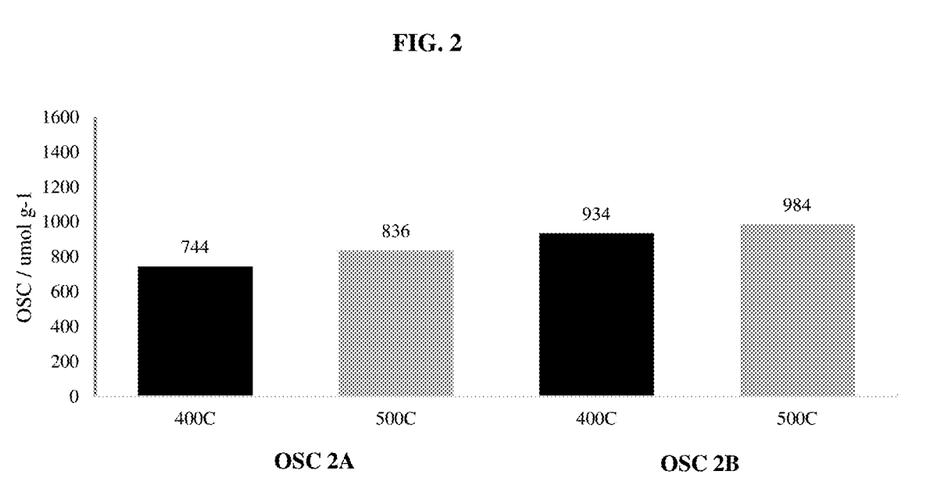
FIG. 2 shows the results of experiments described in Example 2.

The corresponding abilities to release $O_2$ by OSC Method 1 for OSC 2A and OSC 2B are given in FIG. 2. Again, as shown in FIG. 2, the abilities to release $O_2$ at both 400° C. and 500° C. were substantially higher for OSC 2B having the Ce—O—Ce CN at or near the theoretical minimum, than for OSC 2A having Ce—O—Ce CN further away from this minimum value.

Example 3: $Y_{0.063}Ce_{0.437}Zr_{0.5}O_{1.969}$ was prepared as follows. An extra conductive carbon black Ketjen EC300J (5 g) was dispersed in water (400 mL) using a Silverson mixer (4000 rpm, 10 min). The dispersion was then magnetically stirred and the pH was adjusted to ca. 9. Yttrium nitrate hexahydrate (2.39 g, 0.00625 mol) was dissolved in water and ceric nitrate solution (1M, 43.75 ml, 0.04375 mol) and zirconyl nitrate solution (2.2M, 22.6 ml, 0.05 mol) were added to give total volume of ca. 100 mL. This salt solution was pumped into the carbon slurry at 10 mL/min. The pH was maintained at 9 throughout. When the addition was complete the slurry was stirred for 30 mins and then the carbon supported material was collected by filtration. The sample was washed with water and dried for 16 hrs at 105° C.

The carbon supported mixed oxide precursor was fired in $H_2$ at 1050° C. for 4 hrs to induce ordering without heavily sintering the material. The carbon was then removed by firing in air at 600° C. for 1 hr.

$Y_{0.063}Ce_{0.437}Zr_{0.5}O_{1.969}$ particles (obtained as described above as OSC 3B) had the following characteristics:
SSA: 23 m$^2$/g;
crystallite size: 20 nm;
$I_{14.5}/I_{29.5}$: ~0.016; and
theoretical minimum Ce—O—Ce CN: 4.5.

A separate batch of material was prepared as described above except firing was carried out in air at 600° C. for 2 hrs without treatment in 100% $H_2$. This gave a reference carbon-free sample as OSC 3A.

After treatment at 600° C. air as described above, the measured Ce—O—Ce CN in OSC 3A was found to be: 7.5±0.4 (within 67% of theoretical).

After treatment at 1050° C. $H_2$ followed by 600° C. air described above, the measured Ce—O—Ce CN in OSC 3B was found to be: 5.0±0.3 (within 11% of theoretical).

Figure 3:
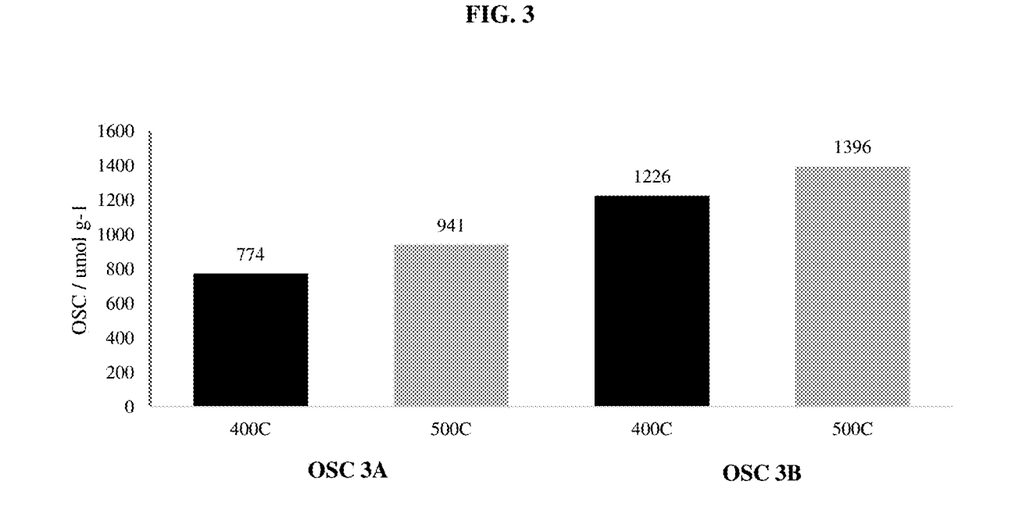
FIG. 3 shows the results of experiments described in Example 3.

The corresponding abilities to release $O_2$ by OSC Method 1 for OSC 3A and OSC 3B are given in FIG. 3. Again, as shown in FIG. 3, the abilities to release $O_2$ at both 400° C. and 500° C. were substantially higher for the samples having the Ce—O—Ce CN at or near the theoretical minimum, than for the samples having Ce—O—Ce CN further away from this minimum value.

Example 4: $La_{0.015}Nd_{0.045}Ce_{0.24}Zr_{0.705}O_{1.98}$ particles were separately treated with air (OSC 4A) and hydrogen (SRMO) (OSC 4B) at 900° C.

The SRMO treated particles (OSC 4B) had the following characteristics:
SSA: 78 m$^2$/g;
crystallite size: 8 nm;
$I_{14.5}/I_{29.5}$: ~0.000; and
theoretical minimum Ce—O—Ce CN: 3.6.

After treatment at 90° C. air for 4 hrs, the measured Ce—O—Ce CN in OSC 4A was found to be: 4.6±0.5 (within 27% of theoretical).

After treatment at 900° C. SRMO, the measured Ce—O—Ce CN in OSC 4B was found to be: 3.9±0.6 (within 8% of theoretical).

Figure 4:
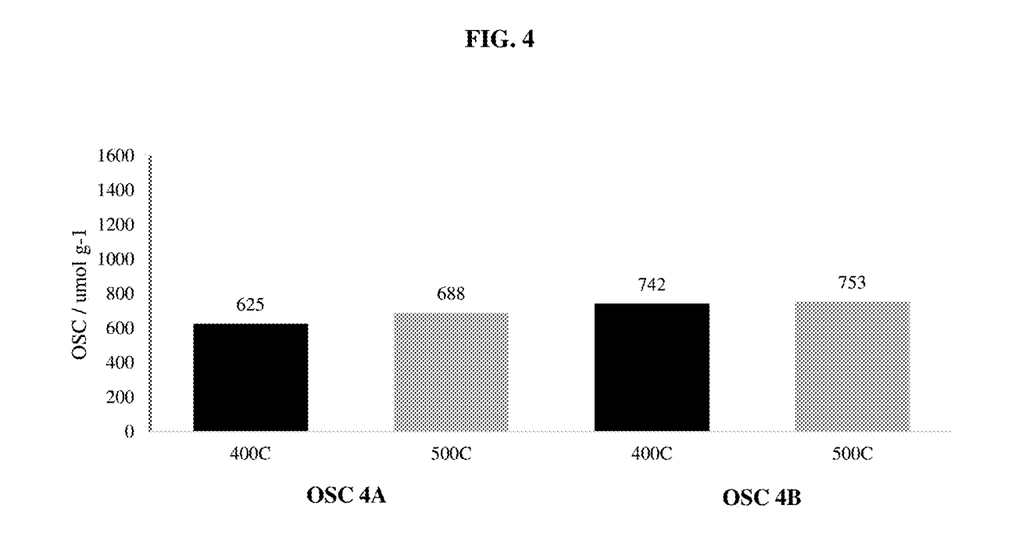
FIG. 4 shows the results of experiments described in Example 4.

The corresponding abilities to release $O_2$ by OSC Method 1 for OSC 4A and OSC 4B are given in FIG. 4. Again, as shown in FIG. 4, the abilities to release $O_2$ at both 400° C. and 500° C. were substantially higher for OSC 4B having the Ce—O—Ce CN at or near the theoretical minimum, than for OSC 4A having Ce—O—Ce CN further away from this minimum value.

Example 5: $Y_{0.125}Ce_{0.375}Zr_{0.5}O_{1.97}$ was prepared as follows. An extra conductive carbon black Ketjen EC300J (5 g) was dispersed in water (400 mL) using a Silverson mixer (4000 rpm, 10 min). The dispersion was then magnetically stirred and the pH was adjusted to ca. 9. Yttrium nitrate hexahydrate (4.79 g, 0.0125 mol) was dissolved in water and ceric nitrate solution (1M, 37.5 ml, 0.0375 mol) and zirconyl nitrate solution (2.2M, 22.6 ml, 0.05 mol) were added to give total volume of ca. 100 mL. This salt solution was pumped into the carbon slurry at 10 mL/min. The pH was maintained at 9 throughout. When the addition was complete the slurry was stirred for 30 mins and then the carbon supported material was collected by filtration. The sample was washed with water and dried for 16 hrs at 105° C.

A portion of the dried carbon supported mixed oxide precursor was fired in $N_2$ at 1050° C. for 4 hrs to induce ordering without heavily sintering the material. The carbon was then removed by firing in air at 600° C. for 1 h. The resulting particles (OSC 5B) had the following characteristics:

SSA: 24 $m^2$/g;
crystallite size: 13.5 nm;
$I_{14.5}/I_{29.5}$: ~0.006; and
theoretical minimum Ce—O—Ce CN: 4.5.

A separate portion of the dried carbon supported mixed oxide precursor was fired in air at 600° C. for 1 h without carbothermal treatment to provide a reference as OSC 5A.

After treatment at 600° C. air as described above, the measured Ce—O—Ce CN in OSC 5A was found to be: 6.7±0.5 (within 48% of theoretical)

After carbothermal treatment as described above, the measured Ce—O—Ce CN in OSC 5B was found to be: 4.8±0.4 (within 6% of theoretical).

Figure 5:
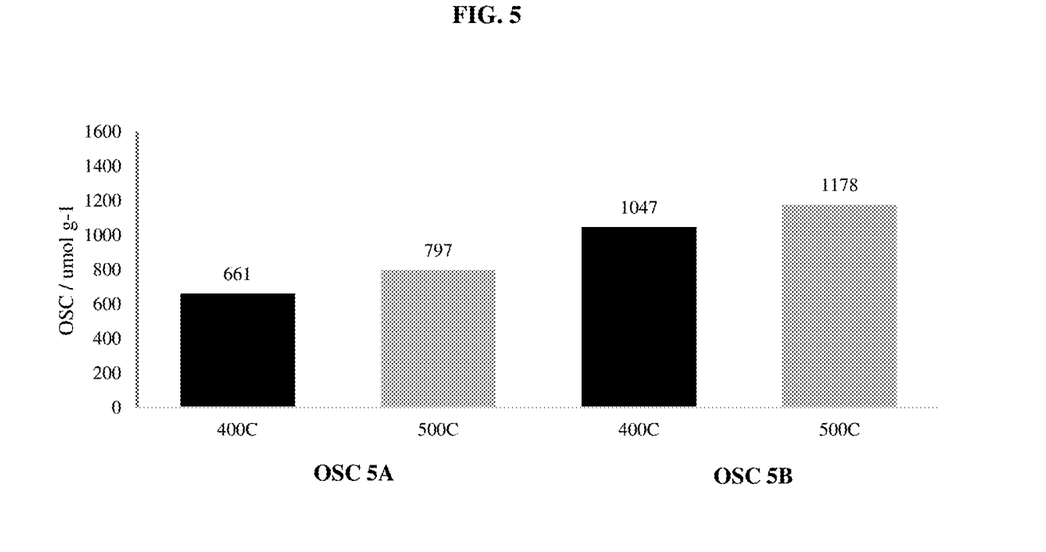
FIG. 5 shows the results of experiments described in Example 5.

The corresponding abilities to release $O_2$ by OSC Method 1 for OSC 5A and OSC 5B are given in FIG. 5. Again, as shown in FIG. 5, the abilities to release $O_2$ at both 400° C. and 500° C. were substantially higher for OSC 5B having the Ce—O—Ce CN at or near the theoretical minimum, than for OSC 5A having Ce—O—Ce CN further away from this minimum value.

Example 6: $Y_{0.063}Ce_{0.375}Zr_{0.562}O_{1.969}$ was prepared as follows. An extra conductive carbon black Ketjen EC300J (5 g) was dispersed in water (400 mL) using a Silverson mixer (4000 rpm, 10 min). The dispersion was then magnetically stirred and the pH was adjusted to ca. 9. Yttrium nitrate hexahydrate (2.39 g, 0.00625 mol) was dissolved in water and ceric nitrate solution (1M, 37.5 ml, 0.0375 mol) and zirconyl nitrate solution (2.2M, 25.4 ml, 0.05625 mol) were added to give total volume of ca. 100 mL. This salt solution was pumped into the carbon slurry at 10 mL/min. The pH was maintained at 9 throughout. When the addition was complete the slurry was stirred for 30 mins and then the carbon supported material was collected by filtration. The sample was washed with water and dried for 16 hrs at 105° C.

A portion of the carbon supported mixed oxide precursor was fired in $N_2$ at 1050° C. for 4 h to induce ordering without heavily sintering the material. The carbon was then removed by firing in air at 600° C. for 1 h. The resulting particles (OSC 6B) had the following characteristics:

SSA: 22 $m^2$/g;
crystallite size: 14.7 nm;
$I_{14.5}/I_{29.5}$: ~0.01; and
theoretical minimum Ce—O—Ce CN: 4.5.

A separate portion of the carbon supported mixed oxide precursor was fired in air at 60° C. for 1 h to provide a reference as OSC 6A.

After treatment at 600° C. air as described above, the measured Ce—O—Ce CN in OSC 6A was found to be: 6.9±0.5 (within 53% of theoretical).

After carbothermal treatment as described above, the measured Ce—O—Ce CN in OSC 6B was found to be: 4.7±0.3 (within 4% of theoretical).

Figure 6:
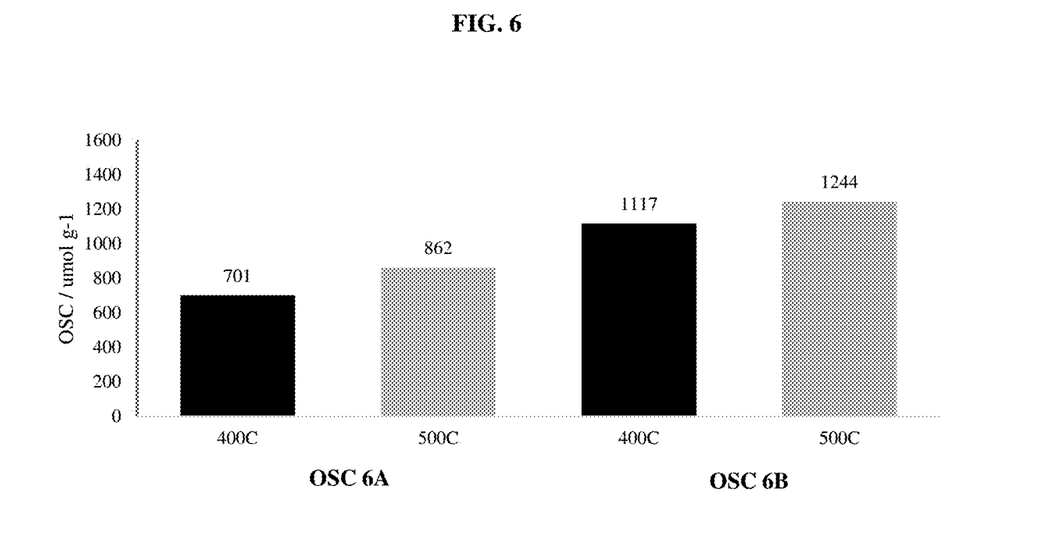
FIG. 6 shows the results of experiments described in Example 6.

The corresponding abilities to release $O_2$ by OSC Method 1 for OSC 6A and OSC 6B are given in FIG. 6. Again, as shown in FIG. 6, the abilities to release $O_2$ at both 400° C. and 500° C. were substantially higher for OSC 6B having the Ce—O—Ce CN at or near the theoretical minimum, than for OSC 6A having Ce—O—Ce CN further away from this minimum value.

Example 7: Single-layered three-way catalyst formulations were further prepared using OSC 2A and OSC 2B.

Catalyst 7A: is a three-way (Pd—Rh) catalyst with a single layer structure. The washcoat consists of Pd and Rh supported on OSC 2A, La-stabilized alumina, and Ba promotor. The washcoat loading was about 3.0 g/$in^3$ (about 1.5 g/$in^3$ of OSC 2A) with a Pd loading of 63.6 g/$ft^3$ and a Rh loading of 6.4 g/$ft^3$. This washcoat was coated on a ceramic monolithic substrate (using standard coating procedures), dried at 100° C. and calcined at 500° C. for 30 minutes.

Catalyst 7B: Catalyst 7B was prepared according to the similar procedure as Catalyst 7A with the exception that OSC 2B was used, instead of OSC 2A.

Figure 7:
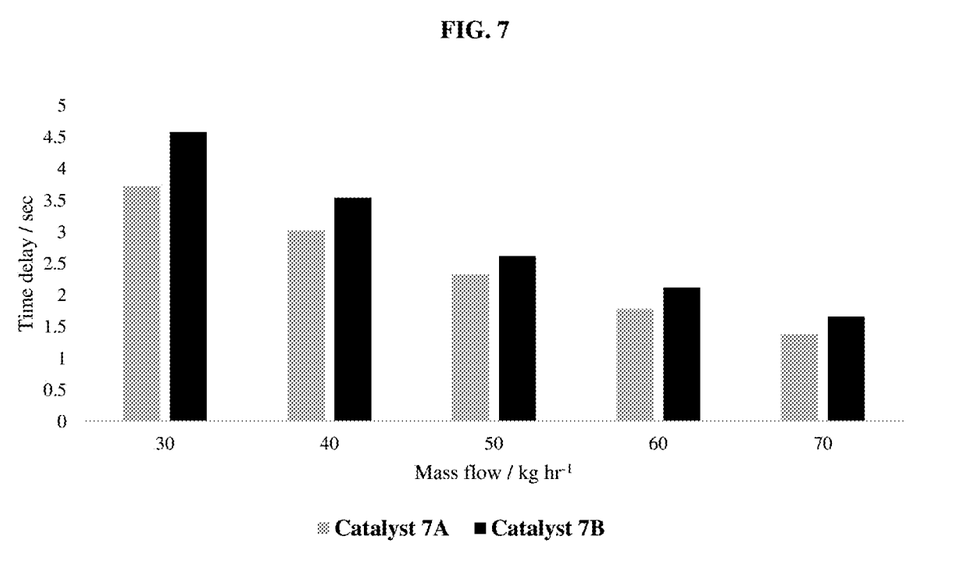
FIG. 7 shows the results of experiments described in Example 7.

The corresponding abilities to release $O_2$ by OSC Method 2 for Catalyst 7A and Catalyst 7B are given in FIG. 7. As shown in FIG. 7, the ability to release $O_2$ at 400° C. for all mass flow rates tested was substantially higher for Catalyst 7B (containing OSC 2B having the Ce—O—Ce CN at or near the theoretical minimum), than for Catalyst 7A (containing OSC 2A having Ce—O—Ce CN further away from this minimum value).

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, each in its entirety, for all purposes, or at least for the context in which they were used herein.

What is claimed:

1. A composition comprising a crystalline mixed oxide having
   a stoichiometry of $Ln_yCe_xM_wO_z$; where
      0.15≤x≤0.5, y≤0.25, w=(1−x−y)≥0.5, and z=(2x+2w+1.5y);
   M is Zr, Hf, Ti, Sn, Ge, or a combination thereof;
   Ln is Y and/or one or more rare-earth metals, exclusive of Ce;
   wherein the Ce is evenly distributed through the lattice; and
   wherein the crystalline mixed oxide has a crystallite size in a range of from about 1 nm to about 100 nm.

2. The composition of claim 1, wherein M is or comprises Zr, Hf, or a mixture or combination thereof.

3. The composition of claim 1, wherein Ln is La, Nd, Pr and/or Y.

4. The composition of claim 1, wherein the crystalline mixed oxide is present as mesoporous or macroporous aggregates or agglomerates.

5. The composition of claim 1, wherein the crystalline mixed oxide has a surface area in a range of from about 10 $m^2 g^{-1}$ to about 100 $m^2 g^{-1}$.

6. The composition of claim 1, wherein the crystalline mixed oxide is present in a tetragonal phase, a cubic phase, or a combination thereof.

7. The composition of claim 1, wherein the crystalline mixed oxide exhibits a powder X-Ray Diffraction (PXRD) pattern, wherein the ratio of diffraction line intensities at $2\theta=14.5\pm0.5°$ and $2\theta=29.5\pm1°$ ($I_{14.5}/I_{29.5}$) is less than 0.02.

8. The composition of claim 1, wherein the crystalline mixed oxide has a Ce—Ce coordination number (CN) that is within 20% of the theoretical minimum value for the corresponding composition assuming perfect Ce distribution.

9. A method of preparing the crystalline mixed oxide of claim 1, the method comprising:
  (a) subjecting oxide precursors of the Ce, the one or more of Zr, Hf, Ti, Sn or Ge and the optional Y and/or one or more other rare-earth metals, exclusive of Ce to reduction conditions to form a reduced form of the crystalline mixed oxide; and
  (b) optionally oxidizing the reduced form of the crystalline mixed oxide to form the crystalline mixed oxide.

10. The method of claim 9, wherein the reduction conditions are a carbothermal reduction or a hydrogen reduction.

11. The method of claim 10, wherein the oxide precursors of the Ce, the one or more of Zr, Hf, Ti, Sn or Ge and the optional Y and/or one or more other rare-earth metals, exclusive of Ce are deposited onto a high surface carbon support before subjecting the supported oxide precursors to the carbothermal reduction conditions.

12. The composition of claim 1 is useful in (a) a gasoline after-treatment system, including a Three-Way Catalyst (TWC) or (coated) gasoline or diesel particulate or soot filter; (b) a lean $NO_x$ trap for diesel after-treatment system; (c) a passive $NO_x$ adsorber (PNA); (d) a diesel oxidation catalyst (DOC); (e) a Water-Gas Shift catalyst; (f) a hydrocarbon reforming catalyst, including as a steam reforming and/or partial oxidation catalyst; and/or (g) a high-temperature water splitting catalyst to give $H_2$.

13. A catalyst article comprising the composition of claim 1, wherein the catalyst article is a TWC, a (coated) gasoline or diesel particulate or soot filter, a lean $NO_x$ trap for diesel after-treatment, a PNA, a DOC, Water-Gas Shift catalyst, a hydrocarbon reforming catalyst, a steam reforming catalyst, a partial oxidation catalyst; and/or a high-temperature water splitting catalyst.

14. A composition comprising a crystalline mixed oxide having
  a stoichiometry of $Ln_y Ce_x M_w O_z$; where
    $0.15 \leq x \leq 0.5$, $y \leq 0.25$, $w=(1-x-y) \geq 0.5$, and $z=(2x+2w+1.5y)$;
  M is Zr, Hf, Ti, Sn, Ge, or a combination thereof;
  Ln is Y and/or one or more rare-earth metals, exclusive of Ce;
  wherein the Ce is evenly distributed through the lattice; and
  wherein the crystalline mixed oxide exhibits a powder X-Ray Diffraction (PXRD) pattern,
  wherein the ratio of diffraction line intensities at $2\theta=14.5\pm0.5°$ and $2\theta=29.5\pm1°$ ($I_{14.5}/I_{29.5}$) is less than 0.02.

15. A composition comprising a crystalline mixed oxide having
  a stoichiometry of $Ln_y Ce_x M_w O_z$; where
    $0.15 \leq x \leq 0.5$, $y \leq 0.25$, $w=(1-x-y) \geq 0.5$, and $z=(2x+2w+1.5y)$;
  M is Zr, Hf, Ti, Sn, Ge, or a combination thereof;
  Ln is Y and/or one or more rare-earth metals, exclusive of Ce;
  wherein the Ce is evenly distributed through the lattice; and
  wherein the crystalline mixed oxide has a Ce—Ce coordination number (CN) that is within 20% of the theoretical minimum value for the corresponding composition assuming perfect Ce distribution.

\* \* \* \* \*